United States Patent Office

2,997,425
Patented Aug. 22, 1961

2,997,425
METHOD OF PURIFICATION OF STREPTOKINASE
Heron Orlando Singher, Plainfield, and Richard Egan, Bound Brook, N.J., assignors to Ortho Pharmaceutical Corporation, a corporation of New Jersey
No Drawing. Filed May 5, 1959, Ser. No. 811,004
3 Claims. (Cl. 195—66)

This invention relates to the purification of streptokinase. More particularly, this invention relates to a method of purification in which streptokinase is adsorbed on diethylaminoethyl cellulose and selectively removed and recovered in substantially pure form.

Streptokinase is valuable and important in the field of medicine because of its ability to activate profibrinolysin to form fibrinolysin, an enzyme capable of lysing fibrin and clotted blood. Pure streptokinase may also have use in the activation of profibrinolysin present in the blood stream by intravenous injection. Profibrinolysin isolated from human blood may be activated by streptokinase to produce fibrinolysin, and the fibrinolysin may be used by intravenous injection to alleviate occlusion of blood vessels by thrombi. In order for fibrinolysin to be suitable for intravenous injection, it is necessary that it be free from inactive proteinaceous materials which might result in allergenic reactions. Accordingly, it is important to prepare substantially pure streptokinase for use in the treatment of profibrinolysin to produce fibrinolysin suitable for intravenous injection.

An object of the present invention is to provide a method of purifying crude streptokinase which is simple, economical, and does not require expensive reagents and procedures.

Another object of this invention is to provide a method of purification which provides substantially pure streptokinase suitable for administration by intravenous injection.

The present invention is based upon the discovery that substantially pure streptokinase may be obtained by passing a substantially salt-free aqueous solution of crude streptokinase, buffered at a pH of about 5.7 to 7.7, over diethylaminoethyl cellulose, whereby streptokinase is adsorbed, and selectively removing the adsorbed streptokinase by passing an aqueous buffer solution having a pH of about 5.7 to 7.7 and an ionic strength of about 0.11 to 0.13 over the adsorbent, dialyzing the solution, and freezing and lyophilizing the dialyzed solution.

The process of this invention is particularly adapted for the purification of substantially salt-free streptokinase having a concentration of about 1000 to 2000 units per milligram of dry powdered material. Streptokinase units are expressed in terms of the Christensen unit, Journal of Clinical Investigation, volume 28, page 163 (1949). Substantially salt-free, dry, powdered streptokinase having a concentration of about 1000 to 2000 units per milligram may be obtained by dissolving crude streptokinase mixed with salt in water and precipitating streptokinase from the aqueous solution by the addition of ethyl alcohol while the temperature of the aqueous solution and alcohol are at −5° C. or below, removing the precipitated streptokinase by centrifugation while the temperature of the solution is maintained at −5° C. or below, dissolving the streptokinase in water, filtering the solution to remove insoluble matter, and freezing and lyophilizing the filtered solution. Salt may also be removed from an aqueous solution of crude streptokinase by dialysis.

The adsorbent used in the process of this invention is diethylaminoethyl cellulose, preferably having a particle size of about 300 mesh, which is described in the Journal of the American Chemical Society, volume 78, page 751 (1956). An adsorption column is prepared by passing an aqueous buffer solution, such as an acetate or phosphate buffer solution having a pH of about 5.7 to 7.7, through a column of the adsorbent until the effluent has a pH of about 5.7 to 7.7. A solution of crude, salt-free streptokinase having a concentration of about 1000 to 2000 units per milligram dissolved in a minimum amount of a buffer solution having a pH of about 5.7 to 7.7 is slowly added to the column and after addition is complete, additional buffer solution having a pH of about 5.7 to 7.7 is passed through the column until the effluent is substantially protein-free. The concentration of protein in the effluent is measured by determining the optical density thereof by a Beckman D.U. spectophotometer set at a wavelength of 280 millimicrons. When the optical density of the effluent is about equal to the optical density of the buffer solution, the effluent is substantially protein-free. The addition of a buffer solution to the column after the streptokinase solution has been added results in the removal of proteinaceous material having substantially no streptokinase activity. It is necessary that the pH of the buffer solution in which the streptokinase is dissolved and the buffer solution which is passed through the column after the streptokinase has been adsorbed be about 5.7 to 7.7, the preferred range being about 5.7 to 5.85. If the pH of the buffer solution is below about 5.7, some streptokinase is precipitated from the solution of streptokinase and if the pH of the buffer solution is above about 7.7, the purity of the streptokinase obtained by the process is decreased. Additional proteinaceous material having no streptokinase activity is removed by slowly passing a buffer solution, having a pH of about 5.7 to 7.7, preferably about 5.7 to 5.85, and an ionic strength of about 0.10, through the column until the effluent is substantially protein free. This solution is prepared from a buffer solution having a pH of about 5.7 to 7.7 by the addition of an inorganic salt, preferably sodium chloride. If the ionic strength of the buffer solution is less than about 0.1, the volume of solution required is so large that it is inconvenient to handle, and if the ionic strength is greater than about 0.1, some streptokinase is removed from the adsorbent with the inactive proteinaceous material.

Substantially pure streptokinase is removed from the adsorbent by slowly passing through the column a buffer solution having a pH of about 5.7 to 7.7, preferably 5.7 to 5.85, and an ionic strength which is gradually increased from about 0.1 to about 0.11 to 0.13. The streptokinase is present in the effluent when the ionic strength of the buffer solution is about 0.11 to 0.13. If the ionic strength of the buffer solution is not brought to 0.11, all of the streptokinase is not removed from the adsorbent and if the ionic strength of the buffer solution is brought to greater than about 0.13, all of the streptokinase as well as some inactive proteinaceous material is removed from the adsorbent so that the streptokinase obtained is of lower concentration. The volume of buffer solution added to the column to remove streptokinase is equal to at least about twice the holdup volume of the column. If the volume of the solution is less than about twice the holdup volume of the column, all of the streptokinase is not removed from the adsorbent, and if the volume of the solution is substantially greater than about twice the holdup volume of the column, all of the streptokinase is removed from the adsorbent but the method is cumbersome because of the large volume of solution required to be handled. In order to ensure that all streptokinase has been removed from the adsorbent, a small amount of additional buffer solution having a pH of about 5.7 to 7.7 and an ionic strength of about 0.11 to 0.13 may be added until the effluent is substantially protein-free. The effluent containing substantially pure streptokinase is dialyzed against distilled water to remove any inorganic salt, and the dialyzed solution is frozen and lyophilized.

The lyophilized streptokinase has about ten times the activity of the crude streptokinase used in the process of the invention.

The invention may be described in greater detail in the following example which will serve to illustrate the invention but is not intended to limit the scope thereof.

A Pyrex glass column three centimeters in diameter fitted with a porous plate at the bottom is filled with diethylaminoethyl cellulose to a height of sixty centimeters. An aqueous acetate buffer solution having a molarity of 0.02 and a pH of 5.7 is passed through the column until the effluent has a pH of 5.7.

One gram of substantially salt-free powdered streptokinase having an activity of about 2000 units per milligram is dissolved in 50 milliliters of the same buffer solution used to prepare the column and the solution is slowly added to the top of the column. After addition of streptokinase solution is complete, an additional amount of the same buffer solution is added to the top of the column drop-wise until the effluent from the column is substantially protein-free. The effluent is considered to be protein-free when its optical density, measured in a Beckman D.U spectophotometer at a wavelength of 280 millimicrons, is about the same as the optical density of the buffer solution. The effluent is substantially protein-free after 750 milliliters of buffer solution has passed through the column. A substantial amount of inactive proteinaceous material is removed from the column by the buffer solution.

Buffer solution having a pH of 5.70, to which sodium chloride has been added to bring the ionic strength to 0.10, is added drop-wise to the top of the column until the effluent is substantially protein-free. After 900 milliliters of this buffer solution have passed through the column, the effluent is substantially free. Inactive proteinaceous material is removed in this solution.

A gradient elution apparatus consisting of an upper reservoir and two mixing chambers on a lower level is arranged above the column. Each of the mixing chambers contains a magnetic stirrer. The mixing chambers are maintained at superatmospheric pressure by adjusting the liquid level of the upper reservoir. The atmospheric pressure in the upper reservoir is maintained consistent by the use of a Marriotte tube. Each of the two mixing chambers contains an initial amount of 1,000 milliliters of 0.08 molar sodium chloride in 0.02 molar sodium acetate buffer solution having a pH of 5.7. The upper reservoir contains 6000 milliliters of 0.25 molar sodium chloride in 0.02 molar sodium acetate buffer solution having a pH of 5.7. Additional solution is added to the upper reservoir as required to maintain the volume of solution in the lower chambers constant. Gradient elution of streptokinase adsorbed on the diethylaminoethyl cellulose of the column is commenced by permitting the solution in the upper reservoir to flow slowly into the first mixing chamber while the content thereof is stirred by means of the magnetic stirrer. The solution flows from the first mixing chamber into the second mixing chamber while the content is stirred by means of the magnetic stirrer in that chamber. The solution flows from the second mixing chamber onto the column. By means of the above apparatus, the ionic strength of the solution flowing onto the column is slowly increased from 0.1 to 0.12 during the time 700 milliliters of liquid is added to the column. The holdup volume of the column is 350 milliliters. After 700 milliliters of buffer solution have been added to the column and 700 milliliters of effluent have been collected, substantially all of the adsorbed streptokinase has been removed from the column. Additional buffer solution having ionic strength of 0.12 is added to the column until the effluent is substantially protein-free.

The effluent is dialyzed against distilled water and frozen and lyophilized. The dry powdered lyophilized material has an activity of 20,000 units per milligram.

What is claimed is:

1. The method of purifying streptokinase which comprises dissolving substantially salt-free powdered streptokinase in an aqueous solution buffered at a pH of about 5.7 to 7.7, adding the solution to an adsorbent column of diethylaminoethyl cellulose which has been prepared for passing therethrough an aqueous solution buffered at a pH of about 5.7 to 7.7, whereby streptokinase is adsorbed on the adsorbent, adding to the column aqueous solution buffered at a pH of about 5.7 to 7.7, whereby inactive proteinaceous material is removed from the adsorbent, adding to the column aqueous buffer solution having a pH of about 5.7 to 7.7 and an ionic strength of 0.1, whereby additional inactive proteinaceous material is removed from the adsorbent, adding to the column an amount of aqueous buffer solution equal to at least about twice the holdup volume of the column and having a pH of about 5.7 to 7.7 and an ionic strength at the beginning of the addition of 0.1 and gradually increasing during the addition so that at the end thereof the ionic strength is 0.11 to 0.13, whereby streptokinase is removed from the adsorbent and a solution of substantially pure streptokinase is obtained, and recovering streptokinase from the solution.

2. The method of purifying streptokinase which comprises dissolving substantially salt-free powdered streptokinase in an aqueous solution buffered at a pH of about 5.7 to 5.85, adding the solution to an adsorbent column of diethylaminoethyl cellulose which has been prepared by passing therethrough an aqueous solution buffered at a pH of about 5.7 to 5.85, whereby streptokinase is adsorbed on the adsorbent, adding to the column aqueous solution buffered at a pH of about 5.7 to 5.85, whereby inactive proteinaceous material is removed from the adsorbent, adding to the column aqueous buffer solution having a pH of 5.7 to 5.85 and an ionic strength of 0.1, whereby additional inactive proteinaceous material is removed from the adsorbent, adding to the column an amount of aqueous buffer solution equal to at least about twice the holdup volume of the column and having a pH of about 5.7 to 5.85 and an ionic strength at the beginning of the addition of about 0.1 and gradually increasing during the addition so that at the end thereof the ionic strength is 0.11 to 0.13, whereby streptokinase is removed from the adsorbent and a solution of substantially pure streptokinase is obtained, and recovering streptokinase from the solution.

3. The method of purifying streptokinase which comprises dissolving substantially salt-free powdered streptokinase in an aqueous solution buffered at a pH of about 5.7 to 7.7, adding the solution to an adsorbent column of diethylaminoethyl cellulose which has been prepared by passing therethrough an aqueous solution buffered at a pH of about 5.7 to 7.7, whereby streptokinase is adsorbed on the adsorbent, adding to the column aqueous solution buffered at a pH of about 5.7 to 7.7, whereby inactive proteinaceous material is removed from the adsorbent, adding to the column aqueous buffer solution having a pH of about 5.7 to 7.7 and an ionic strength of 0.1, whereby additional inactive proteinaceous material is removed from the adsorbent, adding to the column an amount of aqueous buffer solution equal to at least about twice the holdup volume of the column and having a pH of about 5.7 to 7.7 and an ionic strength at the beginning of the addition of 0.1 and gradually increasing during the addition so that at the end thereof the ionic strength is 0.11 to 0.13, whereby streptokinase is removed from the adsorbent and a solution of substantially pure streptokinase is obtained, dialyzing the solution and freezing and lyophilizing the dialyzed solution.

References Cited in the file of this patent

UNITED STATES PATENTS 2,753,291   Morwat et al. _____ July 3, 1956

OTHER REFERENCES

Proceedings of The Society for Experimental Biology, N.Y., vol. 94, pp. 233 to 236 and 254 to 258 (1957).

Ion Exchangers in Organic and Biochemistry, pp. 320–338, Interscience Publishers Inc., New York (1957).